Figure 1:
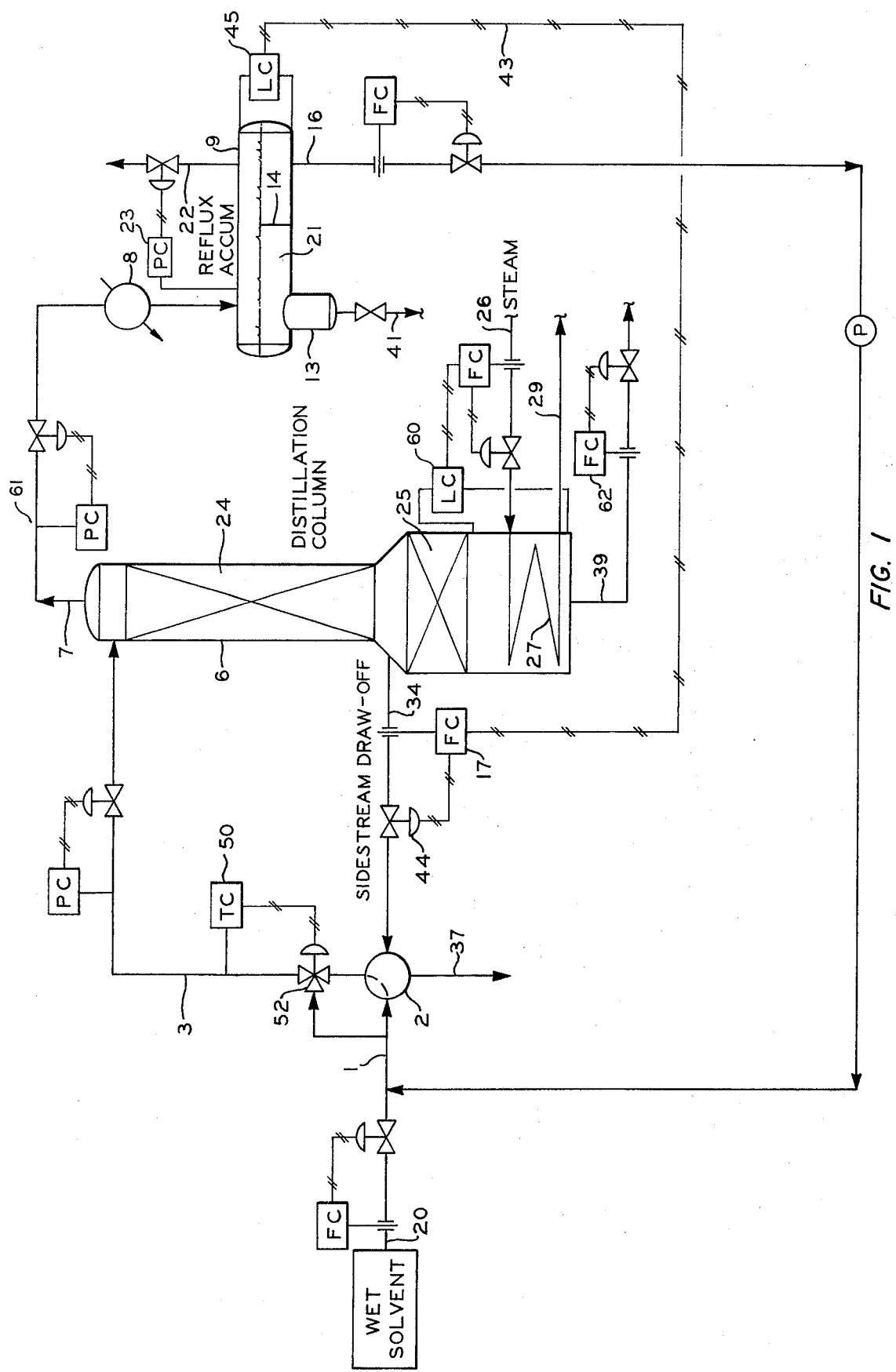

United States Patent
Walker

[11] 3,939,045
[45] Feb. 17, 1976

[54] DISTILLATION METHOD AND APPARATUS

[75] Inventor: Harry L. Walker, Bartlesville, Okla.

[73] Assignee: Phillips Petroleum Company, Bartlesville, Okla.

[22] Filed: Jan. 9, 1974

[21] Appl. No.: 431,944

Related U.S. Application Data

[63] Continuation-in-part of Ser. No. 284,619, Aug. 29, 1972, abandoned.

[52] U.S. Cl. ............ 203/1; 203/DIG. 18; 202/181; 196/132; 62/21; 208/DIG. 1
[51] Int. Cl.² .......................................... B01D 3/42
[58] Field of Search ......... 203/1, DIG. 18; 202/160, 202/202, 18 R; 196/132; 208/DIG. 1; 235/151.12; 62/21, 37

[56] References Cited
UNITED STATES PATENTS

| | | | |
|---|---|---|---|
| 3,359,185 | 12/1967 | Matta | 203/1 |
| 3,411,308 | 11/1968 | Bellinger | 202/160 |
| 3,475,287 | 10/1969 | De Graff | 202/181 |

Primary Examiner—Norman Yudkoff
Assistant Examiner—Frank Sever

[57] ABSTRACT

A method and apparatus for the separation of a normally liquid stream comprising low, high and intermediate volatility components by distilling the feed stream in a distillation zone, removing a vaporous overhead stream comprising the high volatility components together with some of the intermediate volatility component, removing from a central portion of the zone a vaporous side stream consisting essentially of the intermediate volatility component, the rate of removal of the intermediate volatility component being controlled by the liquid level of the intermediate volatility component condensed from the overhead stream and contained in a reservoir.

6 Claims, 2 Drawing Figures

DISTILLATION METHOD AND APPARATUS

This application is a continuation-in-part of my application Ser. No. 284,619 filed Aug. 29, 1972, now abandoned.

This invention relates to the purification of a feed stream by distillation. In one of its aspects, this invention realtes to the purification of a feed stream comprising at least three components of differing volatilities. More specifically, this invention relates to the purification of a solvent employed in catalytic polymerization, the solvent being the component of intermediate volatility and being contained in a stream in which butane and water are the components of high volatility and a chemical ingredient such as an antioxidant and/or a short-stopping agent is the component of low volatility.

In the method of this invention, a feedstream comprising the three components of differing volatilities is introduced into a fractionation zone. An overhead stream comprising the high volatility component together with some of the intermediate volatile component is withdrawn and accumulated in a reservoir. A side stream comprising the intermediate volatility component is withdrawn and a bottom stream comprising the low volatility component is withdrawn. The liquid level of the intermediate volatility component in the reservoir is sensed and the side stream is controllably withdrawn responsive to that level. The level in the reservoir can be a function of both the high and the intermediate volatility components.

In the specific application of the method of this invention to its employment for the purification of cyclohexane employed in catalytic polymerization of monomers for the production of rubber, the overhead stream will consist essentially of nitrogen, water, butane and pentanes together with some cyclohexane. The side stream will consist essentially of cyclohexane and the bottom stream will consist essentially of a short-stopping agent, such as 2,6-tert-butyl-4-methylphenol. While the invention will be explained in terms of this embodiment, it is not to be considered as being limited thereto.

The apparatus of this invention will comprise fractionation means, conduit means for withdrawing the streams of differing volatilities, reservoir means for accumulating the overhead stream of intermediate volatility, liquid level control means associated with the reservoir for controlling the level in the reservoir and delivering a signal responsive thereto, and control means for controllably withdrawing a sidestream from the fractionation means responsive to the aforementioned signal.

In one of the aspects of the apparatus, the reservoir will be adapted with a knock-back zone which is employed to return heavier portions of the overhead stream to the reservoir as some of the lighter materials of the overhead stream are vented from the reservoir.

Figure 2:
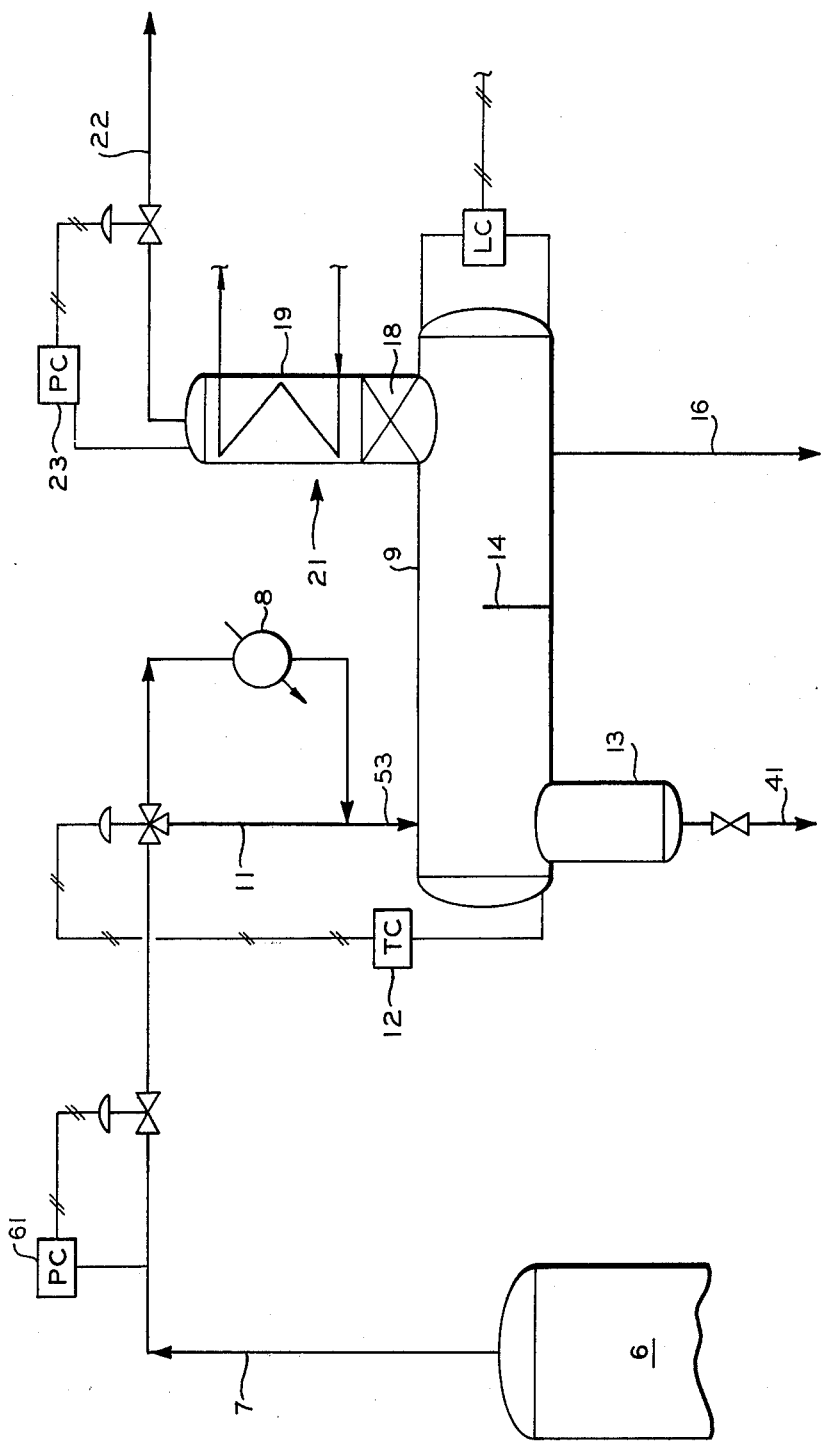

The invention will be more easily understood if explained in conjunction with the attached drawings in which FIG. 1 illustrates a first embodiment of the invention and in which FIG. 2 illustrates a knock-back zone in conjunction with the reservoir.

The invention will be explained in relation to the purification of a cyclohexane stream from a polymerization unit, the stream being comprised of butanes and water as the high volatility material, cyclohexane as the intermediate volatility material and 2,6-di-tert-butyl-4-methylphenol as the low volatility material.

Referring now to FIG. 1, a wet solvent stream comprising nitrogen, water, butanes, pentanes, cyclohexane and the methylphenol is passed through conduit 20 to the process. A recycle stream comprising principally butanes and cyclohexane is passed from accumulator 9 into the wet solvent stream by conduit 16. The combined stream is passed through conduit 1, heat exchanger 2, conduit 3, and into distillation column 6. Temperature controller 50 is provided in conjunction with valve 52 to by-pass the combined stream around exchanger 2 as desired to attain the proper inlet temperature to the distillation column.

Distillation column 6 can be comprised of a packed or tray section 24, a packed or tray section 25 and a reboiler section in the form of steam coils 27 through which steam is introduced by means of conduit 26 responsive to the liquid level controller-flow controller combination 60, the condensate leaving the coils through conduit 29.

A vaporous overhead stream comprising nitrogen, water, butanes, pentanes and cyclohexane is removed from the column through conduit 7 in which pressure controller 61 is positioned, this controller controlling the pressure on the distillation column. The overhead stream is at least partially condensed upon passing through condenser 8 and enters accumulator 9.

Accumulator 9 is adapted with settling-leg 13 into which water gravitates and from which it is disposed through conduit 41. An overhead vapor product comprising nitrogen, water, butanes, pentanes and cyclohexanes, is vented from the accumulator through conduit 22 as controlled by pressure controller 23.

The accumulator is adapted with weir 14 which facilitates separation of the water from the lighter liquids contained in the accumulator upstream of the weir at 21. A stream from which a principal portion of the water has been separated and comprising small quantities of nitrogen, water and pentanes and larger quantities butanes and cyclohexane is passed through conduit 16 into conduit 1.

As shown in FIG. 2, accumulator 9 can be adapted with a knock-back zone 21 which comprises a packed, or tray, section 18 and condenser coil 19. Some portion of the condensibles are disentrained or condensed from the vapors leaving the accumulator by this knock-back zone.

A vaporous sidestream-drawoff consisting essentially of cyclohexane and, perhaps, minor quantities of butanes and pentanes is taken from the midportion of the column through conduit 34. Flow controller 17 measures the rate of withdrawal of the sidestream, compares the measured rate to a set point signal responsive to the level of the liquid phase in accumulator 9 and controls the flow rate of the sidestream withdrawal in response thereto by manipulating valve 44. The set point signal is delivered from liquid level measuring means 45 to flow controller 17 by electrical or fluid conduit 43. As the liquid level measured by means 45 increases, valve 44 is caused to open thereby increasing the rate of withdrawal of the sidestream. As the liquid level in the accumulator decreases, the rate of sidestream withdrawal is decreased. In this manner, the level of the intermediate volatility component in the reservoir is sensed and the rate of side-stream withdrawal from the distillation column is controlled responsive to the level of the liquid in the reservoir.

The sidestream-drawoff is passed in heat exchange in heat exchanger 2 with the feedstream and is passed to disposal through conduit 37. Having been dehydrated and substantially freed from the short-stop agent, the condensed cyclohexane can be recycled to the polymerization unit.

A low volatility component stream consisting of traces of butanes and pentanes and larger quantities of cyclohexane and 2,6-di-tert-butyl-4-methylphenol is withdrawn from the distillation column through conduit 39 at a preselected rate controlled by flow controller 62 and routed to disposal.

Since the method of this invention as employed in the above example is directed to producing a side stream substantially free of 2,6-di-tert-butyl-4-methylphenol and water, and containing minimum quantities of butanes and pentanes, a deep overhead cut is taken into the intermediate volatility component. This results in considerable quantities of the cyclohexane, the intermediate volatility component being taken overhead into the accumulator. However, it is evident that the method of this invention could be equally well carried out when taking an overhead stream consisting principally of butane, the high volatility component.

The best mode of practicing the method of this invention as applied to the purification of a cyclohexane stream is illustrated by the following calculated example exemplifying the procedure in terms of which the method of the invention has been explained with reference to the drawings.

In this example, it is desired to produce a side draw-off cyclohexane stream containing substantially no water or short-stop reagent and thereby produce a cyclohexane stream suitable for recycle to the polymerization.

In the following Table, streams are identified by conduit line corresponding to FIG. 1 and the quantities are expressed in terms of pounds per stream day.

The method of this invention can be carried out under any suitable operating conditions depending upon the nature of the streams and the relative volatilities of the materials concerned. For the purpose of carrying out the invention as explained in the specific embodiment, preferred and broad operating conditions are as indicated in Table II.

Table II

| | TEMPERATURE & PRESSURE CONDITIONS | | | |
|---|---|---|---|---|
| | Exemplary Case | | Broad Range | |
| Point of Measurement | °F. | Pressure, psig | °F. | Pressure, psig |
| Feed (20) | 100 | 35 | 80–100 | 25–40 |
| Fractionator Accumulator (9) | 108 | 20 | 100–110 | 15–20 |
| Fractionator Top (7) | 196 | 25 | 175–240 | 20–35 |
| Fractionator Feed (3) | 205 | 30 | 185–250 | 20–35 |
| Fractionator Side Draw (34) | 218 | 26 | 190–250 | 25–40 |
| Fractionator Kettle (39) | 220 | 28 | 195–255 | 25–40 |

The best mode for carrying out the invention will employ the embodiment of the reflux accumulator as depicted in FIG. 2 of the drawings.

It will be evident from the foregoing that various modifications can be made to the method of this invention. Such, however, are considered as being within the scope of the invention.

What is claimed is:

1. A method for distilling the normally liquid media remaining after a catalytic polymerization to separate the polymerization solvent from components in the normally liquid media which have greater and lesser volatility comprising,
   a. introducing the normally liquid media into a distillation zone;
   b. withdrawing an overhead stream comprising components having volatility higher than that of the polymerization solvent along with some of the polymerization solvent, a side stream comprising said polymerization solvent and a bottom stream comprising components having lower volatility than the polymerization solvent;
   c. accumulating the polymerization solvent that is in the overhead stream in a reservoir; and,
   d. sensing the level of the polymerization solvent in said reservoir and controllably withdrawing said side stream from said distillation zone responsive to said level of said polymerization solvent in said reservoir.

2. The method of claim 1 in which the higher volatility components in said overhead stream comprises water and non-condensible gases.

3. The method of claim 1 in which the liquid media in (a) is passed in heat exchange with said side stream.

4. The method of claim 1 in which said intermediate volatility component is recycled from said reservoir to (a).

Table I

| | MATERIAL BALANCE FOR CYCLOHEXANE PURIFICATION COLUMN | | | | | | |
|---|---|---|---|---|---|---|---|
| Stream | Fresh Feed (20) | Side Draw (34) | OH Vapor Product (22) | Kettle Product (39) | Water Drain (41) | Recycle (16) | OH Vapors to Condenser (7) |
| Nitrogen | 636 | | 636 | | | 241 | 877 |
| Water | 636 | | 4 | | 632 | 124 | 760 |
| Butanes | 4,159 | 75 | 4,084 | T | | 69,816 | 73,900 |
| Pentanes | 40 | 38 | 2 | T | | 58 | 60 |
| Cyclohexane | 2,051,749 | 2,035,330 | 2,029 | 14,391 | | 441,301 | 443,329 |
| 2,6-Di-tert-butyl-4-methylphenol | 473 | | | 473 | | | |
| | 2,057,693 | 2,035,443 | 6,755 | 14,864 | 632 | 511,540 | 518,926 |

T = trace

5. The method of claim 1 in which said lower volatility component comprises a short-stop agent for a polymerization process.

6. The method of claim 1 in which said catalytic polymerization solvent comprises cyclohexane.

* * * * *